No. 739,717. PATENTED SEPT. 22, 1903.
M. REID.
END THRUST BALL BEARING.
APPLICATION FILED SEPT. 26, 1902.

NO MODEL.

Witnesses:

Inventor:
Marcellus Reid
by Wright, Brown & Quinby
Atty.

No. 739,717. Patented September 22, 1903.

UNITED STATES PATENT OFFICE.

MARCELLUS REID, OF PROVIDENCE, RHODE ISLAND, ASSIGNOR, BY DIRECT AND MESNE ASSIGNMENTS, TO HIMSELF, TRUSTEE.

END-THRUST BALL-BEARING.

SPECIFICATION forming part of Letters Patent No. 739,717, dated September 22, 1903.

Application filed September 26, 1902. Serial No. 124,904. (No model.)

*To all whom it may concern:*

Be it known that I, MARCELLUS REID, of Providence, in the county of Providence and State of Rhode Island, have invented certain new and useful Improvements in End-Thrust Ball-Bearings, of which the following is a specification.

This invention relates to end-thrust ball-bearings; and its object is to provide an improved form and construction of separator for bearings of this character.

The improvements wherein the invention consists will be more fully elaborated in the succeeding description and pointed out in the claims.

Figure 1:
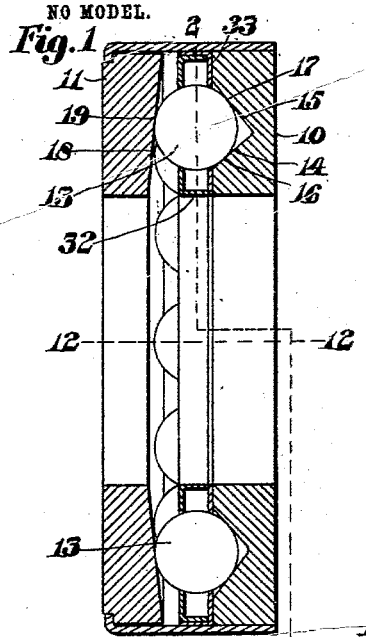
Figure 2:
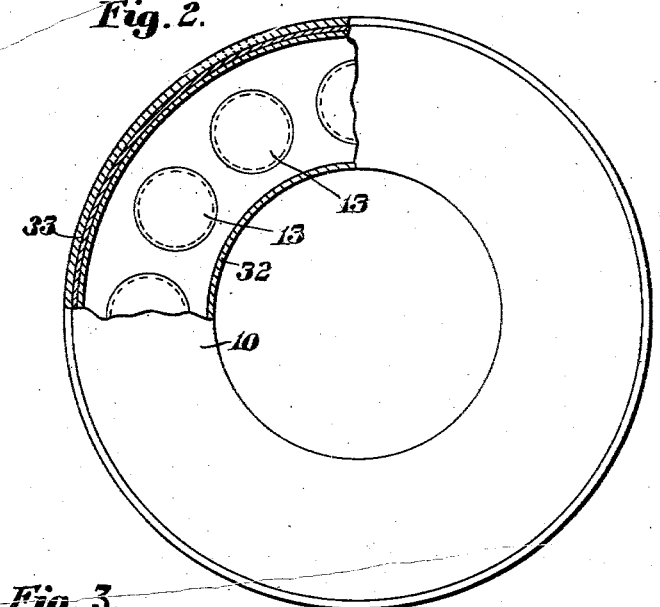
Figure 3:
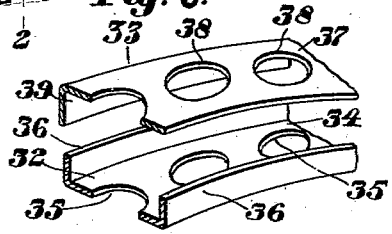

Of the accompanying drawings, Figure 1 represents an axial section of an end-thrust bearing constructed in accordance with my invention. Fig. 2 represents a section on line 2 2 of Fig. 1. Fig. 3 represents a broken perspective view of the ball-separator with its parts separated.

The same reference characters indicate the same parts in all the figures.

In the drawings, 10 11 represent two annular bearing members having a relative rotation about an axis 12 12 and having interposed between them a series of antifriction-balls 13 13.

14 15 are the bearing-faces of the member 10, contacting with the balls at points 16 17, and 18 is the bearing-face of the member 11, contacting with the balls at points 19.

32 33 indicate the annular members of the separator which I employ for spacing the balls apart, and thus preventing mutual contact between them, the member 32 having a radial web 34 and flanges 36 36 parallel with its axis, thus giving the member 32 an annular trough shape. The member 33 has a flange 39 parallel to the flanges 36 and of such diameter as to fit outside of the outer one of said flanges 36 and hold the two members 32 33 in frictional engagement. The two members are formed, respectively, with holes 35 38, placed opposite each other in their respective members for receiving the balls 13, said holes being of smaller diameter than the balls in order to prevent the escape of the latter, but of large enough diameter to permit said balls to bear against the bearing-surfaces 14 15 18.

When the separator members 32 33 are fitted together, they form an annular tubular structure which effectively retains the balls, but which may nevertheless be easily taken apart when it is desired to have access to its interior. The separator as thus constructed is not easily warped or distorted in use, as in cross-section the same presents a four-sided construction in which all the sides have adequate support from each other. It is also easily and cheaply manufactured, since the whole of each member of the separator may be stamped up in one operation by means of suitable dies.

I claim—

1. A separator for end-thrust bearings comprising a hollow annular structure inclosed on all sides in the form of a tube, suitable holes or openings being formed in the walls thereof to receive the balls.

2. A separator for end-thrust bearings comprising a hollow annular structure inclosed on all sides in the form of a tube, said separator being formed of two separable members and provided with means for holding the balls in their relative positions.

3. A separator for end-thrust bearings comprising a hollow annular structure inclosed on all sides in the form of a tube, said separator being formed of separable sections having radial webs and concentric telescoping flanges and provided with means for holding the balls.

4. A separator for end-thrust bearings comprising a trough-like member, and a second member resting upon the sides of said trough-like member and having a concentric flange overlapping one of said sides, said sections having means for holding the balls.

In testimony whereof I have affixed my signature in presence of two witnesses.

MARCELLUS REID.

Witnesses:
R. M. PIERSON,
ADELINE C. RATIGAN.